June 20, 1967   C. L. VOLZ   3,325,894
RECIPROCATING CUTTER HEAD FOR DRY SHAVER
Filed Nov. 26, 1965
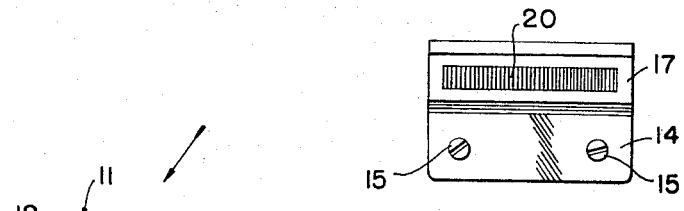
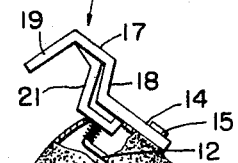
FIG. 1
FIG. 2
FIG. 3
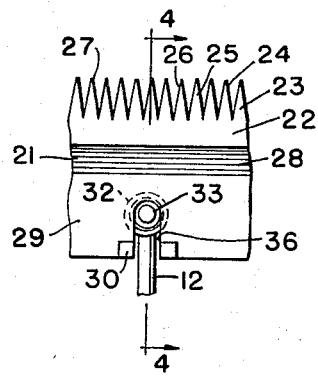
FIG. 4
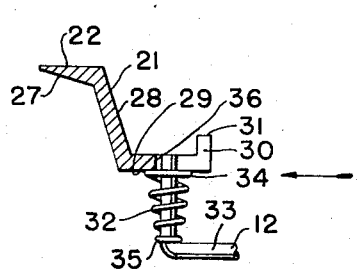
FIG. 5
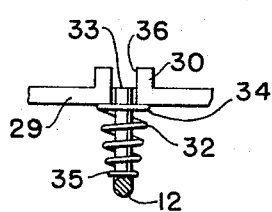
INVENTOR.
CHRIS L. VOLZ
BY
Whittemore Hulbert & Belknap
ATTORNEYS

United States Patent Office 3,325,894
Patented June 20, 1967

3,325,894
RECIPROCATING CUTTER HEAD FOR DRY SHAVER
Chris L. Volz, Troy, Mich., assignor to Martin Pearson, Troy, Mich.
Filed Nov. 26, 1965, Ser. No. 509,727
5 Claims. (Cl. 30—43.92)

The invention relates to dry shavers of the reciprocatory type, adapted to be driven at ultra high speeds by a vibratory electric motor.

In the present state of the art, convenional dry shaver cutter heads are not adaptable to be driven by a sixty cycle vibratory electric motor and this fact is realized by experimental research in this field.

My invention has made it possible to produce a cutter head for a dry shaver which can be driven by a vibratory electric motor at a speed of 14,400 or more cutting strokes per minute. I have attained this end by inventing a novel reciprocating cutter head which can be operated by electric motors already known, but which can be more effectively operated by combining with the novel cutter head a novel form of vibratory electric motor.

The present application for patent is directed only to the novel cutter head, independent of my improvement in vibratory electric motors.

One of the objects of the invention is to obtain a nearly frictionless cutter movement in order to make possible a shaver driven by a 60 cycle vibratory electric motor.

Another object is to provide a cutter head so constructed that when used with an electric drive and more particularly with any 60 cycle electric motor drive, a dry shaver is produced at low cost capable of extremely high cutter speeds.

Another object is to produce a dry shaver capable of operating at 14,400 or more cutting strokes per minute.

A further object is to produce a cutter head having the required cutter rigidity to insure proper operation and long life.

In summary, the invention comprises the combination of a housing having a stationary cutter head attached thereto, which cutter head is pan-shaped with cutting slots at the bottom surface of the pan. A reciprocating arm extends from the housing and operatively engages a movable cutter head with contact between the two parts limited to surface engagement at the bottom surface of the pan and to the engagement of a lateral flange at the opposite end of said movable cutter. The movable cutter preferably is Z-shaped with cutting teeth at one end of the Z and the aforesaid transverse flange at the opposite end of the Z. The reciprocatory arm has a laterally extending rod engaging a slot in the movable cutter at the end of the Z opposite the cutting teeth and there is a spring sleeved on the end of said arm to abut the movable cutter thereby holding the movable cutter in operative relation to the stationary cutter during reciprocation.

These and other objects are obtained by the construction hereinafter more fully set forth and illustrated in the accompanying drawings wherein:

FIGURE 1 is a side elevation of the dry shaver with the upper part of the housing cut away.

FIGURE 2 is a plan view of the stationary head as viewed in the direction of the arrow in FIGURE 1.

FIGURE 3 is an enlarged fractional plan view in the same direction as FIGURE 2 with the stationary cutter removed to illustrate the movable cutter.

FIGURE 4 is a section on the line 4—4 of FIGURE 3.

FIGURE 5 is an end view in the direction of the arrow on FIGURE 4.

In FIGURE 1 there is shown a side view of a dry shaver assembly with the main housing 10 in elevation and the cutter assembly 11 in transverse section. Since the specific construction of the electric motor for driving the cutter head forms no part of the present invention, no attempt has been made to illustrate or describe the motor itself. Suffice it to say that there is an arm 12 extending from the armature of the motor which arm is reciprocated by an electric motor which derives its electric power by means of an electric cord attached to the electric socket 13. The main housing 10 has secured to the upper end thereof the base plate 14 by means of two fastening screws 15. The plate extends at about a 45° angle with respect to the longitudinal axis of the housing and at the free end thereof there is a pan-shaped extension 17 which forms the stationary cutter head. This cutter head has a flange 18 connecting it to the base plate 14. The stationary cutter head also has the angling guard 19 extending from the bottom for a distance slightly greater than that of the flange 18. As shown in FIGURE 2, the bottom of the stationary cutter head has a series of slots 20 of the same general type as are found in conventional dry shaver cutters.

The movable cutter head 21 has a flat face 22 for sliding engagement with the inner flat surface of the stationary cutter head 17. This face 22 is provided with pointed cutting teeth 23 as depicted in FIGURE 3. Between the respective teeth there are a series of slots 24 so that the teeth themselves have oppositely angling sides 25 and 26 which can be sharpened for cutting purposes. The movable cutter head 21 is shown more in detail in FIGURES 3 and 4. The face 22 having the teeth formed therein is wedge-shaped in cross section and at the slotted free end 27, it is reduced in thickness to such a small dimension that, in cross section, it forms almost a point. From the face 22, there is a lateral extension 28 at an angle such that it does not contact with the corresponding angling flange 18 of the stationary cutter. From the extension 28 there is a flat end 29 substantially parallel to the base plate 14 of the stationary cutter. This flat end 29 has a laterally bent flange 30, the end 31 of which bears on the underside of the stationary plate 14. The flange 30 is of limited width midway between the ends of the movable cutter, and it is centrally cut away by the slot 36 in the rear mid portion of flat end 29, as shown in FIGURE 3. The arrangement is such that the movable cutter head 21 contacts with the stationary cutter head only at the faces 22 and 31 respectively. For holding the movable cutter in engagement with the stationary cutter during reciprocation, there is a spring 32, one end 34 of which bears against the flat end 29. This spring surrounds the rod 33 which in turn is a lateral extension from the arm 12 and thus the other end 35 of the spring abuts against the arm 12.

With the construction as above described, reciprocating movement of the cutter 21 is obtained from the arm 12 which extends from the vibratory electric motor and is transmitted by engagement of the free end of rod 33 with the slot 36 in the plate 29. The area of contact between the movable and stationary cutters is restricted to the face 22 and the end 31 of the flange 30. The pressure between the two cutters causes sufficient frictional engagement to provide proper shearing by the cutter teeth, yet the pressure is light. The combination of restricted area of contact and light pressure insures a minimum of friction. This permits vibration of the cutters, under the power of the vibratory electric motor, at speeds of 14,400 or more cutting strokes per minute. This is far in excess of the cutting rate with dry shavers of the prior art.

What I claim as my invention is:

1. In a dry shaver, the combination of a housing, a reciprocatory arm extending therefrom, a stationary cutter secured to said housing having cutting slots therein, a movable cutter operatively connected to said reciprocating arm and having cutting teeth extending to the free edge thereof, the portion of said movable cutter with said teeth having sliding engagement with the stationary cutter with said teeth and said slots in cutting relation to each other, said movable cutter having at the opposite end from said teeth a transverse flange slidingly engageable with said stationary cutter, and spring means for urging said cutters into surface contact, said two cutters being free from engagement with each other except at the positions aforesaid thereby permitting vibratory reciprocation with minimum friction at said surface contact.

2. The combination as set forth in claim 1 in which said stationary cutter is pan-shaped and has said cutting slots at the bottom of the pan.

3. The combination as set forth in claim 2 where the movable cutter is Z-shaped with said cutting teeth at one end of the Z and said traverse flange at the opposite end of the Z.

4. The combination as set forth in claim 3 in which said reciprocatory arm has a laterally extending rod engaging a slot in said movable cutter, at the end of the Z opposite said movable cutting teeth and said spring is sleeved on the end of said arm to abut said movable cutter.

5. The combination as set forth in claim 1 in which said stationary cutter is pan-shaped with said cutting slots at the bottom surface of the pan, said movable cutter is Z-shaped with said cutting teeth at one end of the Z and said transverse flange at the opposite end of the Z, said reciprocatory arm having a laterally extending rod engaging a slot in said movable cutter at the end of Z opposite said cutting teeth, and a spring sleeved on the end of said arm to abut said movable cutter thereby holding the same in operative relation to said stationary cutter.

References Cited
UNITED STATES PATENTS

| | | | |
|---|---|---|---|
| 2,029,791 | 2/1936 | Pluchine | 30—200 |
| 2,171,888 | 9/1939 | O'Connor | 30—43.92 |
| 2,177,440 | 10/1939 | Muros | 30—43.92 |
| 2,184,757 | 12/1939 | Samotey | 30—43.92 |
| 2,222,106 | 11/1940 | Knapp | 30—43.92 |
| 2,272,123 | 2/1942 | Te Pas et al. | 30—43.92 |
| 2,325,267 | 7/1943 | Murphy | 30—41.9 X |
| 2,562,104 | 7/1951 | Kobler et al. | 30—43.92 |

FOREIGN PATENTS 1,069,422  2/1954  France.

WILLIAM FELDMAN, *Primary Examiner.*

MYRON C. KRUSE, *Examiner.*